Patented Nov. 3, 1953

2,657,970

UNITED STATES PATENT OFFICE 2,657,970

STABILIZED STAINS COMPRISING DIOXANE

Lawrence Rudick, Longmeadow, Mass., assignor to Monsanto Chemical Company, St. Louis, Mo., a corporation of Delaware No Drawing. Application April 25, 1951, Serial No. 222,943

3 Claims. (Cl. 8—4)

This invention relates to colored solutions for staining thermoplastic sheets. More particularly, the invention relates to colored dioxane-water solutions which are stable in storage.

Thermoplastic materials are either colorless or slightly yellow or brown. For many purposes they must be colored with dyes or pigments. By batch processes and when the color is to be uniform, it is a simple matter to incorporate the color into the resin before it is formed into the final article. For continuously produced articles such as extruded sheets, rods and tubes, it is advantageous to color the surfaces of the finished shapes. This step is frequently accomplished by dissolving dyes and pigments in a varnish or lacquer which will adhere to the thermoplastic material without marring the surface thereof.

One of the major fields for post coloring of thermoplastics is the tinting of thermoplastic sheets either to overcome the basic yellow color or to provide a colored sheet. This tinting is simply done by dissolving the appropriate dyes in an organic liquid which is also at least a partial solvent for the thermoplastic. The sheet is then dipped into the colored solution for sufficient time to absorb the needed amount of dye to obtain the required tint.

Many and varied organic solvents and combinations thereof have been used with varying degrees of success in this dip-staining process. Among the best of these is a mixture of dioxane and water. Dioxane is a good solvent for a wide variety of thermoplastics and also for oil-soluble organic dyes. By using a mixture of dioxane and water, dip-staining solutions can be regulated to have just the right amount of solvency for the thermoplastic material so that the staining process is rapid and efficient. However, dioxane is easily peroxidized in the presence of air and the peroxides frequently destroy the dye dissolved in the dioxane. As a result, it is impossible to make up large quantities of staining solution since a solution soon loses both its staining potency and color adjustment.

One object of this invention is to provide dioxane-water mixtures which are impervious to the development of peroxides.

A further object of this invention is to provide dip-staining solutions which do not deteriorate in the presence of air.

These and other objects are attained by incorporating a stabilizing amount of diethyl aminoethanol in a dioxane-water mixture having dissolved therein one or more oil-soluble organic dyes.

The following example is given in illustration and is not intended as a limitation of the process of this invention. Where parts are mentioned, they are parts by weight, or percentages by weight.

EXAMPLE

A solution was prepared by mixing 50 parts of dioxane with 50 parts of water. To this solution was added 0.03 part of anthraquinone blue (an alkyl substituted 1,4-diamino anthraquinone) and 0.02 part of oil orange (Colour Index 24). The dyes dissolved readily in the dioxane-water mixture. To one portion of the solution thus made was added 1% by weight of diethyl aminoethanol. The addition of the diethyl aminoethanol did not change the color of the solution nor did it precipitate or otherwise affect the dyes dissolved therein.

Polyvinyl butyral resin sheets were dipped in the modified solution immediately after it was prepared; other sheets were dipped in the same solution after it had been exposed to air for one day and for four days. The sheets were dipped in the solution by mechanical apparatus which insured that the length of dwell in the solution was the same each time. The particular formulation used was designed to stain the sheets a green color having a light transmission in the neighborhood of from 5 to 8%. Tests were run to determine the light transmission of each of the sheets dipped in the modified solution. The results are shown in the table together with results obtained by dipping other sheets of polyvinyl butyral resin in an unmodified portion of the dye solution similarly exposed to air.

Table

| Time of Dip | Percent of Light Transmission | |
|---|---|---|
| | Modified Solution | Unmodified Solution |
| Immediately | 6.5 | 7.0 |
| After one day | 7.5 | 23.0 |
| After four days | 7.5 | 51.0 |

It can be seen from the table that the modified solution did not lose staining power during the storage period whereas the unmodified solution grew so weak after four days of storage that the stained sheets had 50% light transmission as against the original 7%. Furthermore, the shade of green was no longer the same as the original.

Colour Index 24 describes oil orange as benzene-azo-beta naphthol.

The dip-staining solutions of this invention are solutions of oil-soluble organic dyes in a mixture of dioxane and water. The ratio of dioxane to water is preferably 50:50 since, for most applications, this ratio provides the proper balance between the solvent power of the dioxane and the non-solvent action of the water. However, for some types of thermoplastics which are less soluble in dioxane, the solutions should be made up with a greater proportion of dioxane, up to about 80 parts of dioxane for 20 parts of water. In still other circumstances, it is necessary to decrease the amount of dioxane so that the dioxane-water ratio is about 20:80.

Dioxane is a solvent for substantially all of the oil-soluble organic dyes, at least to the extent of about 2% of dye. Since for most dip-staining processes, the concentration of the dye in the solution is considerably less than 2%, dyes which are only partially soluble may be used. The concentration of the dyes in the solution may vary from 0.0001% to about 1% depending on the tinctorial strength of the dyes and the depth of color required in the finished product. A single dye may be used or a mixture of two or more dyes may be needed to attain the desired color and shade and tone.

Diethyl aminoethanol is added to the solutions in amounts which range from 0.5 to 1.5% by weight of the solution. For most purposes, 1% of the diethyl aminoethanol stabilizes the solutions against deterioration for periods as long as several months. However, some dye will precipitate from the solution in the presence of so much of the stabilizer. This necessitates a reduction in amount of stabilizer, with a corresponding reduction in the stability of the solutions. However, below 0.5% of diethyl aminoethanol, the stability of solutions decreases rapidly, e. g., at 0.25%; the solutions deteriorate in less than 24 hours. At 0.5% the solutions are stable for about two days. Some of the oil-soluble dyes may tend to act as catalysts for the peroxidation of the dioxane so that a larger amount of the diethyl aminoethanol must be used. It is satisfactory in these instances to increase the amount of the stabilizer to about 1.5% but beyond that the stabilizer may interfere with the solubility of many of the dyes and does not add substantially to the permanence of the solution. Other common alcohol amines are inoperative in this invention since they are incompatible with and cause precipitation of most of the oil-soluble dyes.

The dip-staining solutions of this invention may be used to color thermoplastic articles and are especially valuable for coloring thermoplastic sheet material. The polyvinyl butyral sheets used in the example contained about 40% of dibutyl sebacate plasticizer. However, polyvinyl butyral sheets containing other plasticizers or no plasticizer may be stained by the process of the invention. Other polyvinyl acetals such as the formaldehyde and acetaldehyde acetals may be colored in this manner as well as sheets and other formed shapes of other thermoplastic vinyl resins, cellulose derivative compositions, etc.

It is obvious that variations may be made in the products and processes of this invention without departing from the spirit and scope thereof as defined in the appended claims.

What is claimed is:

1. A solution comprising dioxane, water, at least one oil-soluble organic dye and from 0.5% to 1.5% by weight of diethyl aminoethanol.

2. A solution as in claim 1 wherein the weight ratio of dioxane to water is 50:50.

3. A solution as in claim 2 wherein the amount of diethyl aminoethanol is 1% by weight.

LAWRENCE RUDICK.

References Cited in the file of this patent

UNITED STATES PATENTS

| Number | Name | Date |
|---|---|---|
| 2,251,486 | Hanson | Aug. 5, 1941 |
| 2,524,811 | Koberlein | Oct. 11, 1950 |